United States Patent [19]
Pringle

[11] Patent Number: 5,559,688
[45] Date of Patent: Sep. 24, 1996

[54] RESONANT POWER FACTOR CONVERTER

[75] Inventor: Daniel Pringle, Guelph, Canada

[73] Assignee: 1,005,539 Ontario Inc., Guelph, Canada

[21] Appl. No.: 196,554

[22] Filed: Feb. 15, 1994

[30] Foreign Application Priority Data

May 19, 1993 [CA] Canada .................. 2096559

[51] Int. Cl.$^6$ ..................... H02M 7/04
[52] U.S. Cl. ..................... 363/89; 363/84
[58] Field of Search ............. 363/16, 17, 36, 363/37, 44–46, 84, 89, 97, 98, 127, 132

[56] References Cited

U.S. PATENT DOCUMENTS

| | | | |
|---|---|---|---|
| 4,677,366 | 6/1987 | Wilkinson et al. | 363/89 |
| 5,019,952 | 5/1991 | Smolenski et al. | 363/16 |
| 5,233,509 | 8/1993 | Ghotbi | 363/89 |
| 5,442,539 | 8/1995 | Cuk et al. | 363/89 |

OTHER PUBLICATIONS

Kocher et al, An AC-to-DC Converter with High Quality Input Waveforms, IEEE, vol. 1A-19, No. 4 Jul./Aug. 1983, 586-599.

Mitchell, John E., Distortion Factor: The "New" Problem of Power Factor, 1992 IEEE, vol. 21-2, 514-515.

Cividino, Lorenzo, Power Factor, Harmonic Distortion: Causes, Effects and Considerations, 1992 IEEE, vol. 21-1, 506-513.

Schlecht, Martin F., Novel Topological Alternatives to the Design of a Harmonic-Free, Utility/DC Interface, 1983, IEEE 206-216.

Koslow, Myron, Power-factor Correction Provides Several User Bonuses, Electronic Products & Technology/Jun./Jul./1991, 46-47.

Severns, Rudy, Electronic Power Factor Correction (part 1), APEC 91, Seminar—Mar. 10, 1991.

Carli, Giampaolo, Harmonic Distortion Reduction Schemes For A New 100A-48V Power Supply, 1992 IEEE, Session 21-4, 524-525, 530-531.

Tollik et al, Comparative Analysis of 1-Phase Power Factor Correction Topologies, 1992 IEEE, Session, 21-3, 517-523.

Wolpert, Tadeus, AC/DC Converter with Sinusoidal Input Current and a Single Conversion Stage, 1992 IEEE, Session 12-1, 271 & 278.

Malesani et al, Single-Switch Three-Phase AC/DC Converter With High Power Factor and Wide Regulation Capability, 1992, Session 12-2, 279 & 285.

Rim et al, AC to DC Power Conversion with Unity Power Factor and Sinusoidal Input Current, 1991 IEEE, 400, 406 & 414.

(List continued on next page.)

Primary Examiner—Matthew V. Nguyen

[57] ABSTRACT

The present invention is directed to a novel converter for interposition between an AC power source and a DC load capable of maintaining a substantially unity power factor independent of the impedance of the load. According to the invention, the converter has rectifying circuit to provide DC power to a DC power output circuit from an AC source, circuit for varying the impedance seen by the AC source in the DC output circuit, and circuit responsive to a shift in AC input current away from an in-phase relation with the voltage of the AC source under loading of the DC power output circuit for controlling said impedance varying circuit in a direction to return the AC current towards in-phase relation with the AC voltage. More particularly, according to the preferred form of the invention, the circuit for varying the impedance seen by the AC source in the DC output circuit includes a resonant circuit interposed between the rectifying circuit and the DC output circuit and connected to deliver DC power thereto. The converter includes a control circuit responsive to the DC voltage of the DC output circuit and the phase between the AC voltage and AC current. The control converter also includes a variable impedance responsive to the resonant circuit current for controlling the phase angle between the resonant circuit current and voltage across the resonant circuit.

22 Claims, 14 Drawing Sheets

UPF BLOCK DIAGRAM

OTHER PUBLICATIONS

Lai et al, Switch–mode Power Supply Power Factor Improvement Via Harmonic Elimination Methods, 1991 IEEE, 415–418, 422.

Kelly et al, Near–Unity–Power–Factor Single–Phase AC–to–DC Converter Using a Phase–Controlled Rectifier, 1991 IEEE, 387, 392.

Prasad et al, A Passive Input Current Waveshaping Method for Three–Phase Diode Rectifiers, 1991 IEEE, 319–329.

Schutten et al, Characteristics of Load Resonant Converters Operated In a High Power Factor Mode, 1991 IEEE, 5–16.

Vorperian et al, A Simple Scheme for Unity Power–Factor Rectification for High Frequency AC Buses, 1990 IEEE, Trans. of Power Elec., vol. 5, No. 1, 77–87.

Bonanni et al, High Performances High Voltage Generator Regulated by L.V.I. 1990 IEEE, 323–329.

Kislovski, A. S., Linear Variable Inductor in Power Processing, 1987 IEEE, 87–102.

Vorperian, V., Approximate Small–Signal Analysis of the Series and the Parallel Resonant Converters, 1989 IEEE, Trans. of Power Elect., vol. 4, No. 1, 15–24.

Steigerwald, R. L., A Comparison of Half–Bridge Resonant Converter Topologies, 1987 IEEE, 135–144.

CURRENT FROM CURRENT TRANSFORMER
ON MAIN POWER CHAIN

VOLTAGE ACROSS PARALLEL TANK

VOLTAGE ON COMPARATOR

RESONANT POWER FACTOR CONVERTER

FIELD OF THE INVENTION

This invention relates to improvements in devices for increasing the power factor in power circuits supplying DC power to a DC load having a complex impedance. More particularly, the invention is directed to a novel converter for interpositioning between an AC source and a DC load which will essentially maintain a unity power factor (UPF) independent of the load impedance.

BACKGROUND OF THE INVENTION

In AC circuits, power factor is defined as the ratio between the real power measured in watts and the apparent power which is the product of the rms voltage and the rms current. The ideal situation is where the power factor is 1, namely that all of the apparent power is real. This occurs when the current drawn from Hydro "looks" like the Hydro voltage, i.e., perfectly sinuosity and in phase with the voltage so that in looking at the two waveforms, it would not be obvious which was which the voltage or the current. With unity power factor the power taken is governed by the formula $$P = V*I \cos(\theta) * D.F.$$

where

V=line voltage

I=line current in amperes

θ=phase angle between V and I

D.F.=Distortion Factor Total Power/Power of Fundamentals

Since θ the phase angle is 0, cos 0° is 1 and D.F. is 1 and P=V*I watts.

If the power factor is less than one, then some or all of the apparent power is not real power and thus is being wasted. In AC circuits the voltage and current are sinusoidal and in phase when the load is a pure resistance or when the impedance of the load is such that the inductance and capacitance of the load balance out and the load is seen as a resistive load. If the impedance of the load is a simple inductive load, the current will still be sinusoidal but will lag the voltage. On the other hand, if the load is a simple capacitive load it will still be sinusoidal but will lead the voltage. In both cases the power factor will be less than unity because Cos θ will be less than 1 and would equal 0 for a theoretical circuit of pure inductance or pure capacitance where the phase difference between the voltage and current is equal to 90°.

For many years, linear loads were the largest portion of the AC distribution system, the bulk of which were resistive loads from lighting and heating elements and inductive loads from motors. As inductive loads caused the current waveform to lag the voltage waveform, to balance the system it was only necessary to add capacitance to the line. However, this is no longer sufficient.

In recent years, there has been an increase in the number of off-line switching non-linear DC power supply loads on the AC distribution systems of electrical utilities. The proliferation of these non-linear loads has caused problems for the electrical distribution utility systems due to the presence of harmonic distortion as measured by the distortion factor.

The blocking effect of the input diodes and the presence of filter capacitors in such off-line power supplies employing diode rectifiers and filter capacitors causes distortion of the current waveform from a sinusoidal to a complex waveform of tall peaks made up of the fundamental frequency (typically 60 Hz) and a number of harmonics or multiples of the fundamental frequency summed together. As it is only the fundamental waveform that contributes to real power, the presence of harmonics can be detrimental for the utility in many ways. Firstly, utilities only charge for real power used and the harmonics do not contribute to real power. Additionally utilities utilize a common neutral wire in their distribution systems. For linear loads, the return current flows in the neutral wire were algebraically cancelled, resulting in no current flow in the neutral wire. The harmonics generated by non-linear loads cannot be cancelled in the usual manner and in fact are additive which can produce dangerous overloads and heating of the neutral wire and central distribution transformers.

Uncorrected off-line switching power supplies generally have a power factor of about 0.65. This means that total currents of 1.54 (1/0.65) times those of the fundamental current are required to produce the real power and that uncorrected power supplies can only draw 65% of the power of a corrected power supply from the same input current. These high peak currents can trip over-current devices, can cause distortions in the voltage waveforms and can cause clipping of both voltage and current waveforms.

Because of these problems, substantial interest in power factor correction for DC power supplies has emerged. This has led in part to the establishment of standards such as European Community Standard IEC-555-2 IEEE 519, and MIL 1399 which regulate the amount of permissible disturbances caused by appliances and other equipment connected to AC lines.

There have been many proposed methods of power factor correction for DC power supplies including passive filtering, multiphase rectification, rotary reactive correction, shunt electronic correction, series electronic correction and combinations of the above. However, all of these techniques present certain drawbacks. For example, passive filters, which involve filtering of the known frequencies of the harmonics, tend to be large, heavy and expensive and can introduce phase shifts further degrading power factor.

At the present time, most commercial systems for power factor converter use high frequency active waveshaping techniques to achieve performance on a wide range of operating conditions. Many of the schemes use a boosting feature of pulsewidth modulation (PWM) boost class converters, hard switched converters or their resonant-switch counterparts. The series resonance converter has some desirable power factor characteristics. However, due to its voltage step down characteristics, it cannot maintain line current into the valleys of the input AC wave and must be shut off typically when the line voltage falls below 50% of its peak value.

One AC-to-DC converter which draws sinusoidal and in phase current waveforms from the AC source was described in IEEE TRANSACTIONS ON INDUSTRY APPLICATIONS, VOL IA-19, pages 586–599, July/August 1983, by Kocher and Steigerwald. The converter was a well-known flyback converter utilizing a field-effect transistor (FET) operating at 45 kHz as a high frequency switch. The shaping of the input current waveform was obtained by modifying the converter to pulsewidth modulate the input power. The control system adjusted the magnitude of the sinusoidal input current to achieve variations in DC output power level.

However, the converter described, while achieving a high power factor under high power applications, only exhibited efficiencies of the order of 60 to 70% under low power applications.

A series/parallel LCC resonant circuit in a high voltage boost, wide bandwidth configuration has been described in an overly simplified schematic manner in IEEE 1991, pages 5 to 16 by Schutten et al. The reference describes the simulated performance of a parallel resonant converter and a combination series parallel resonant converter when operated at a fixed frequency achieving a respectable power factor but far from regulatory requirements. However, active control of a series parallel converter is required to maintain zero voltage switching conditions above resonance under all conditions. Switching above and below the resonant frequency based upon the input line current would cause stress on, and probably destruction of, the system component. The reference does not disclose any means for the active control of this system and as far as I am aware no satisfactory control means has ever been proposed.

SUMMARY OF THE INVENTION

The present invention is directed to a novel converter for interposition between an AC power source and a DC load capable of maintaining a substantially unity power factor independent of the impedance of the load. According to the invention, the converter has rectifying circuit means to provide DC power to a DC power output circuit from an AC source, means for varying the impedance seen by the AC source in the DC output circuit, and means responsive to a shift in AC input current away from an in-phase relation with the voltage of the AC source under loading of the DC power output circuit for controlling said impedance varying means in a direction to return the AC current towards in-phase relation with the AC voltage.

More particularly, according to the preferred form of the invention, the means for varying the impedance seen by the AC source in the DC output circuit comprises a resonant circuit interposed between the rectifying circuit means and the DC output circuit and connected to deliver DC power thereto, said converter including a control circuit therefor responsive to the DC voltage of the DC output circuit and the phase between the AC voltage and AC current, said control converter including a variable impedance responsive to the resonant circuit current for controlling the phase angle between the resonant circuit current and voltage across the resonant circuit.

BRIEF DESCRIPTION OF THE DRAWINGS

The above as well as other advantages and features of the present invention will be described in greater detail according to a preferred embodiment of the present invention in which:

FIGS. 2A to 2F constitute a simplified schematic diagram of the system of FIG. 1 with:

FIG. 2A showing the input diode component,

FIG. 2B showing the FET bridge and resonant circuit,

FIG. 2C showing the isolation transformer, output diode and output capacitor, and FIGS. 2D, 2E and 2F showing the UPF control circuit;

FIGS. 9A to 9C are diagrams illustrating the basic waveforms of the phase control circuit with:

FIG. 9A representing the drive current,

FIG. 9B representing the drive voltage, and

FIG. 9C representing the comparator output voltage constituting the FET drive;

FIGS. 10B–10E are diagrams of the FET drive voltage waveforms;

DETAILED DESCRIPTION OF THE PREFERRED EMBODIMENTS

The present invention provides for a novel technique and circuitry that produces essentially Unity Power Factor (UPF) as seen from the AC hydro source. A particular advantage of the invention is that it is not limited in either the DC power output it can provide or the AC power sources to which it can connect as have other Power Factor improving devices. Other important features of the invention are the cost, size and weight advantages at higher power levels over other known Power Factor improving devices.

Figure 1:
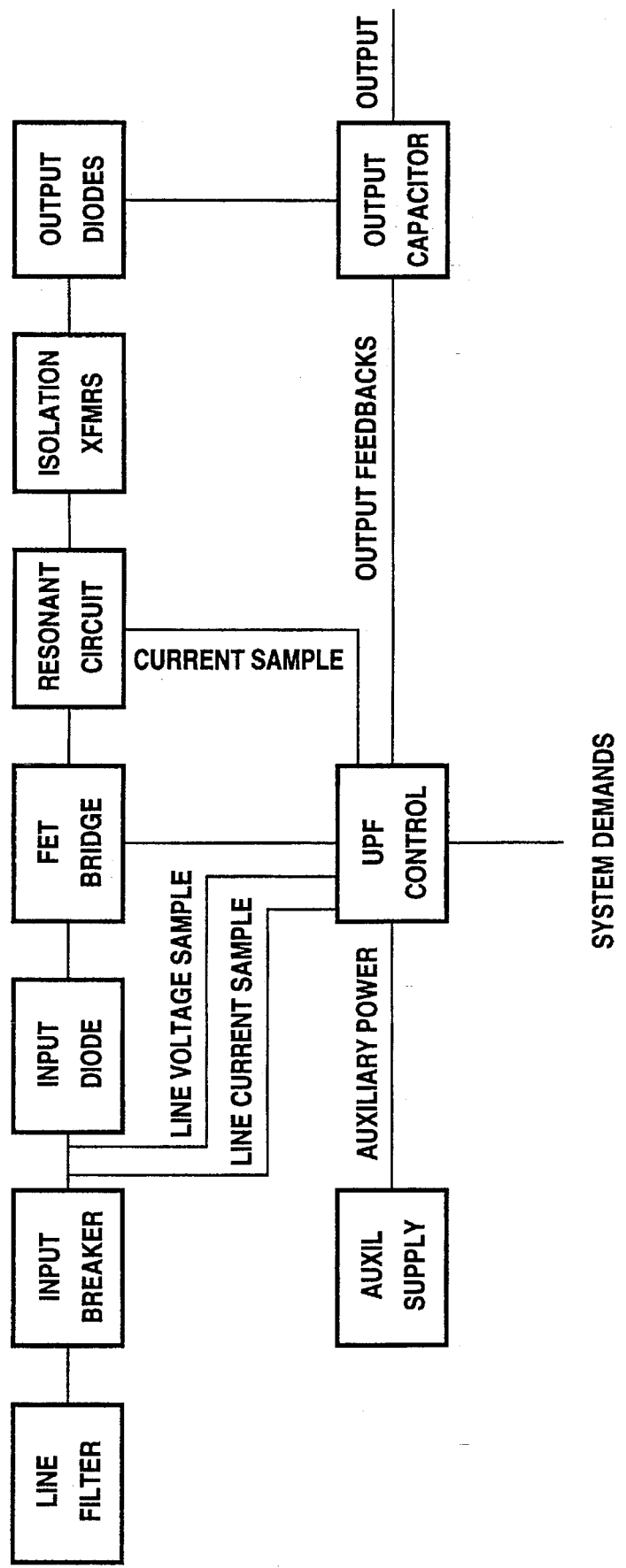
FIG. 1 is a block diagram of a converter embodying the invention.

FIG. 1 shows a block diagram of a converter embodying the invention. The input power is conditioned through a line filter for EMI/RFI (Electromagnetic Interference and Radiofrequency Interference) located as close to the AC terminals as possible. The voltage is then applied to an input diode stage, preferably a diode bridge to form the DC rail voltage in a typical manner. However, this DC rail has minimal energy storage and the voltage on the DC rail follows the envelope of the input AC voltage.

The output from the input diode stage is applied to an inverter stage comprising a FET (Field Effect Transistor)

bridge stage, preferably, a full FET bridge which chops the DC rail voltage and applies it to the resonant circuit stage which is loaded by an isolation transformer, preferably an LCC or a series/parallel resonant circuit configuration. An innovative phase control technique, described below is used to control the inverter stage.

The output of the isolation transformer drives the output diodes to the output DC capacitors of the system. The principal energy storage is in the output DC capacitors which have a relatively large value without inductive elements thereby helping ensure stability when operated with down-stream regulators.

As hereinafter more fully explained, the control of the inverter to give the desired UPF is effected by sensing the output DC voltage, the AC input voltage, the AC input current and applying any change in the sensed DC output voltage or any phase difference between the sensed AC voltage and AC current to a control circuit responsive to the current flowing in the inverter circuit to control the gating of the FET bridge to restore the system to its desired operating condition giving rise to UPF.

FIGS. 2A to 2F illustrate a simplified schematic diagram of the UPF converter shown in block diagram in FIG. 1. It consists of the full input diode bridge D1 in FIG. 2A which creates a DC rail or buss voltage although it will be understood other rectifying circuits may be used if desired. The DC rail or buss has minimal energy storage on it, essentially only enough capacitance to supply a low impedance (at elevated frequencies) to the resonant current flowing in the resonant circuit. Additional low energy filtering may be used to reduce the filtering requirements of the line filter.

Figure 2A:
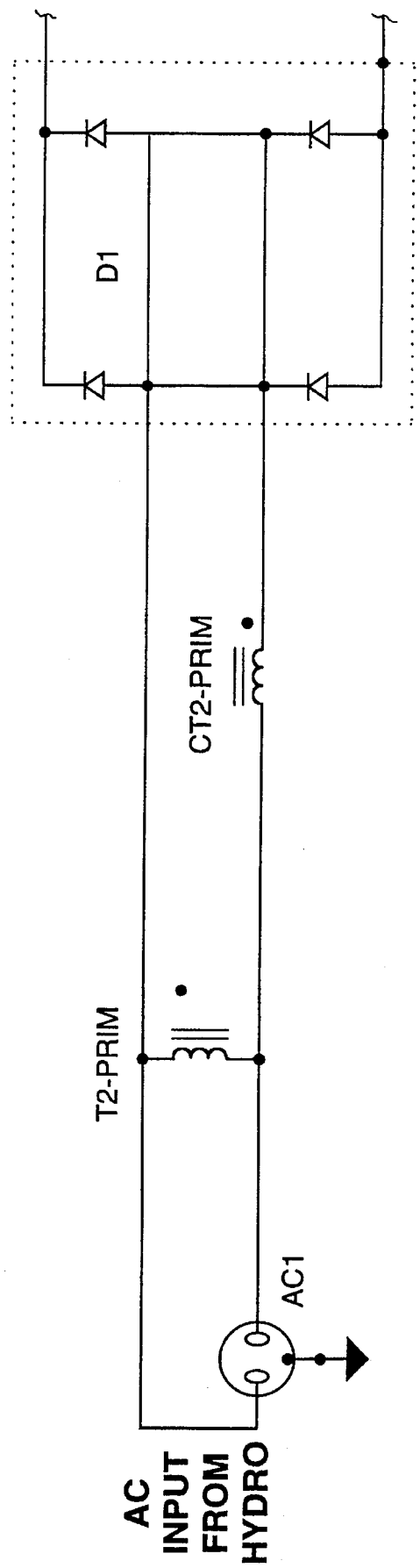
Figure 2B:
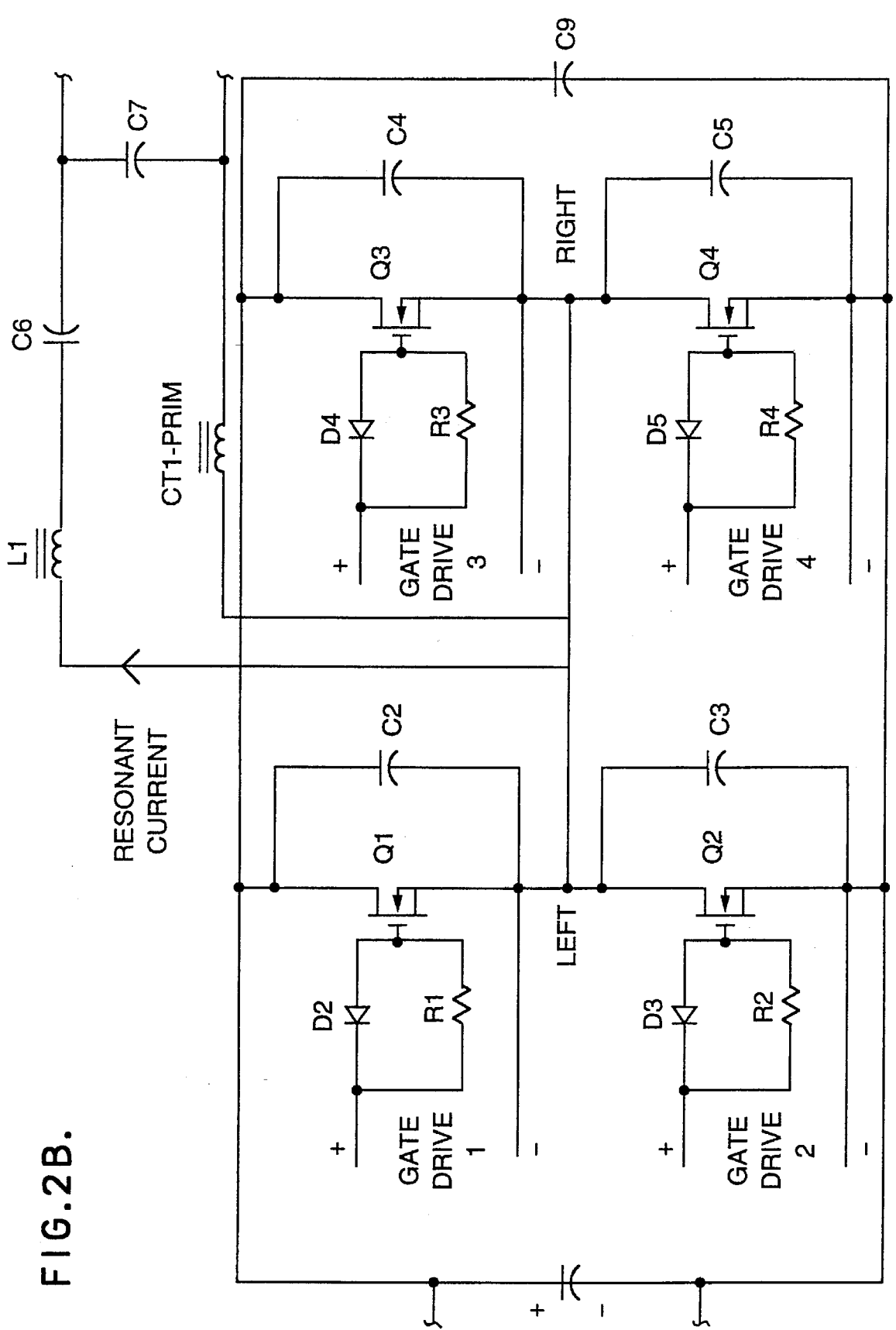

Operating off the DC rail is a full bridge of FETs Q1, Q2, Q3 and Q4 shown in FIG. 2B in an above resonance, zero voltage switching scheme, complete with a lossless snubber controlling the rate of use of voltage across the FET elements. While the full FET bridge is preferable, a half bridge circuit could also be employed. This full bridge is shown in FIG. 2B as running a series/parallel LCC resonant circuit L1, C6, C7 and current transformer primary CT1-prim in a high voltage boost, wide bandwidth configuration although a parallel resonant circuit could be used.

Figure 2C:
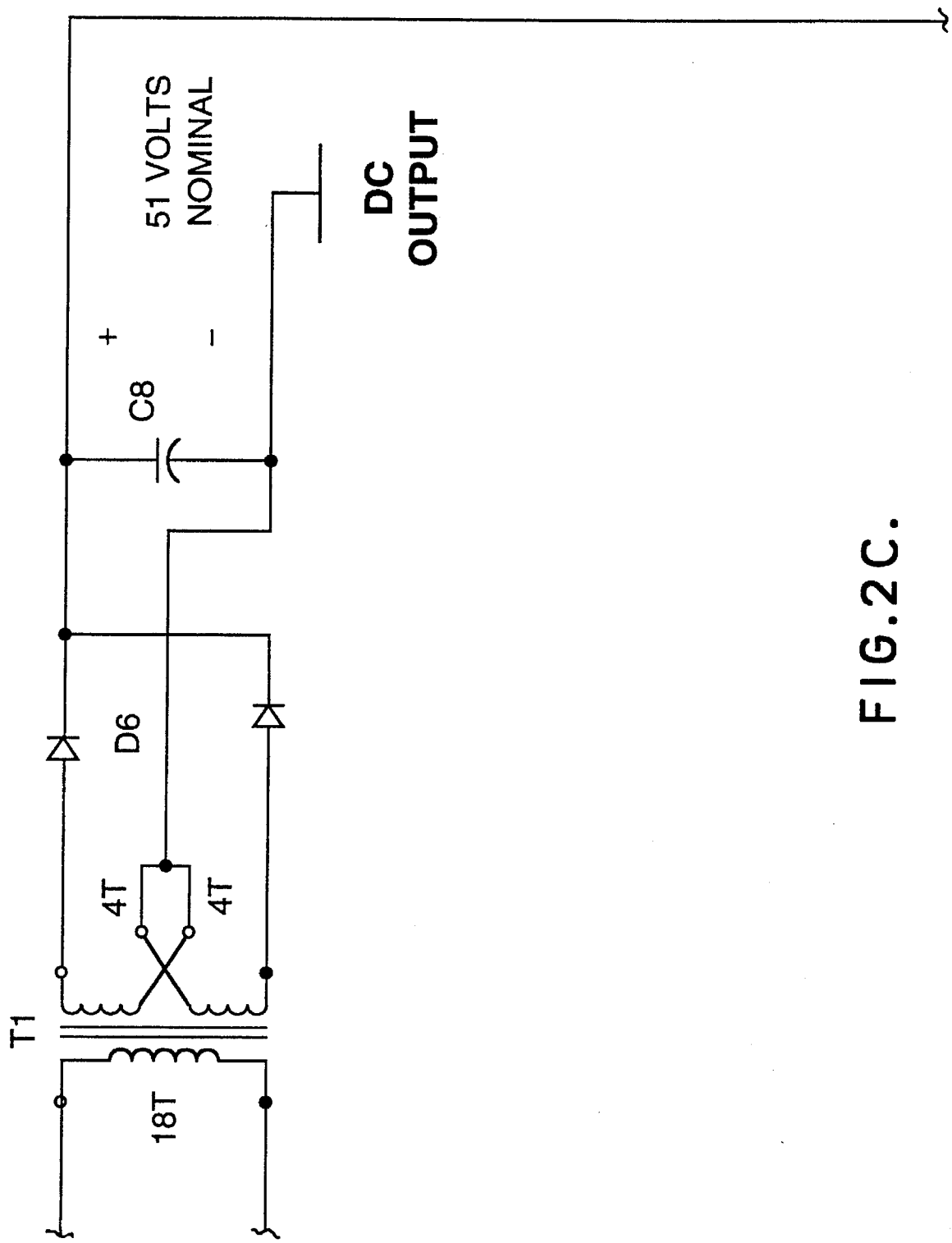

The output of the resonant circuit is loaded by the output transformer T1 in FIG. 2C which both isolates the output voltage as well as allowing any desired output voltage, in this case 62 Vdc. The transformer reflects the load of the output diodes D6 and capacitor C8 onto the resonant circuit. The output capacitor C8 is loaded by the DC output of the converter, or its equivalent resistance.

Figure 2D:
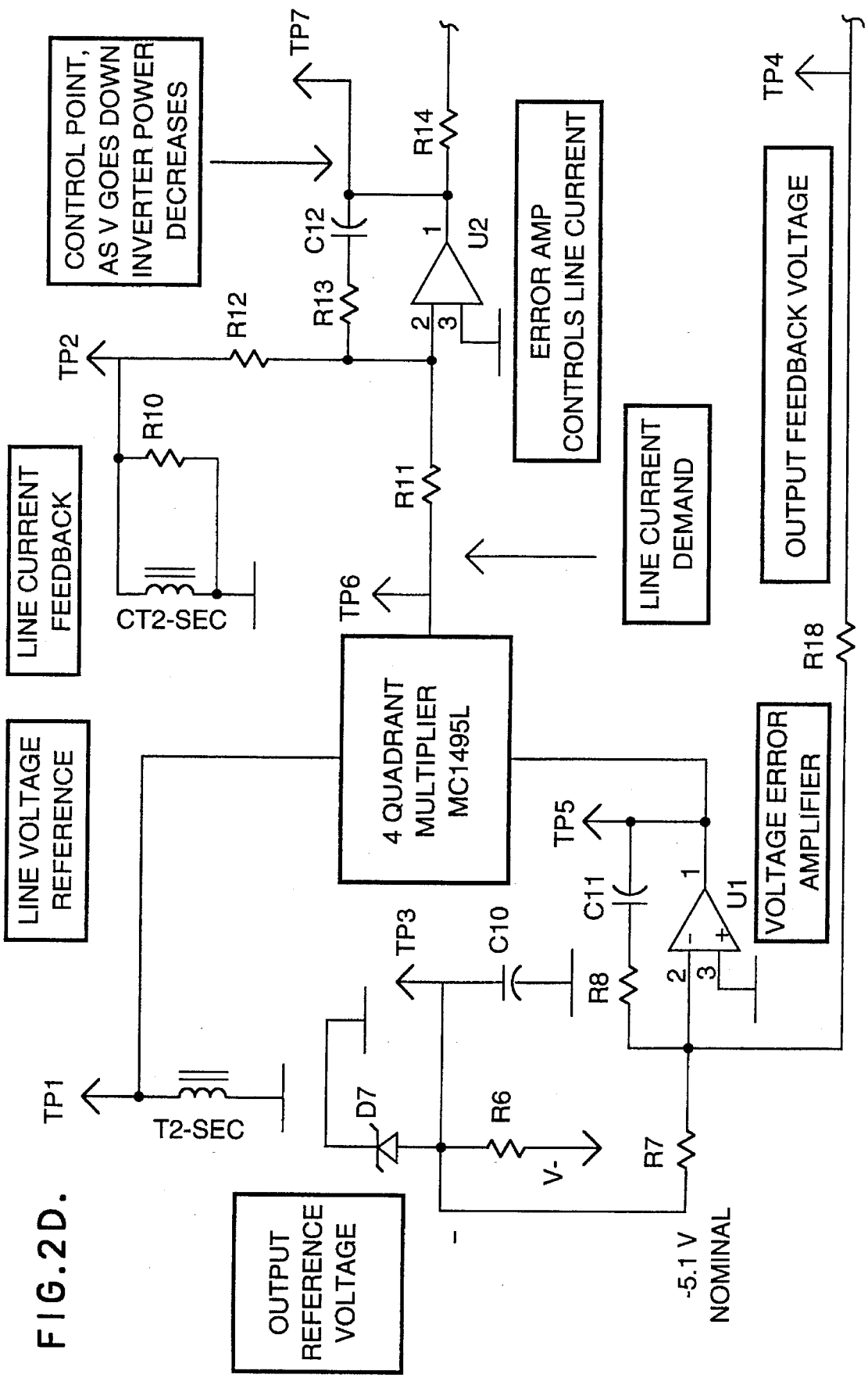

The control system for the inverter FIG. 2D senses the DC output voltage and compares it against a reference voltage in a standard error amplifier circuit U1 which regulates the output voltage. The error signal is multiplied by a representation of the sinusoidal input voltage in a four quadrant IC multiplier MC1495L to create a reference signal whose magnitude keeps the output at the right voltage, but the waveshape, both in magnitude and phase, is the waveshape that the input line current must have to realize Unity Power Factor and thus constitutes a reference line current waveshape. An input current error amplifier U2 compares the phase of the reference line current against the actual line current and when there is a difference, the input error amplifier creates an error signal to a resonant inverter control circuit FIG. 2E to control the instantaneous power output of the inverter so that its input power pulls a line current whose instantaneous magnitude at all times matches the reference current signal. This error signal is reflected as a DC current in a current source transistor Q5 which controls the DC current in a variable impedance in the form illustrated within the doted lines in FIG. 2E as a variable inductor. This inductor is connected in a resonant tank circuit C12, R19 responsive to the current in the inverter resonant circuit through transformer CT1-secondary which resonant tank circuit controls the FET bridge operation as hereinafter more fully described.

Such a circuit arrangement provides a novel phase control system for the inverter circuit by controlling the phase angle between the resonant current waveform and the switched DC rail voltage.

Power output of the inverter bridge at any time is given by the relationship.

$$P = V * I \cos(\theta)$$

where
V=effective AC rail voltage (0.9*V DC)
I=resonant current (rms fundamental)
θ=phase angle between V and I A truly novel characteristic of this converter in that it allows the volt-amperes of the primary circuits to closely match the output power at full load. In an actual embodiment constructed in accordance with the circuit of FIG. 2, 4.0 KVA was utilized in the primary circuits to realize 3.4 Kw output power at near full load.

Figure 2E:
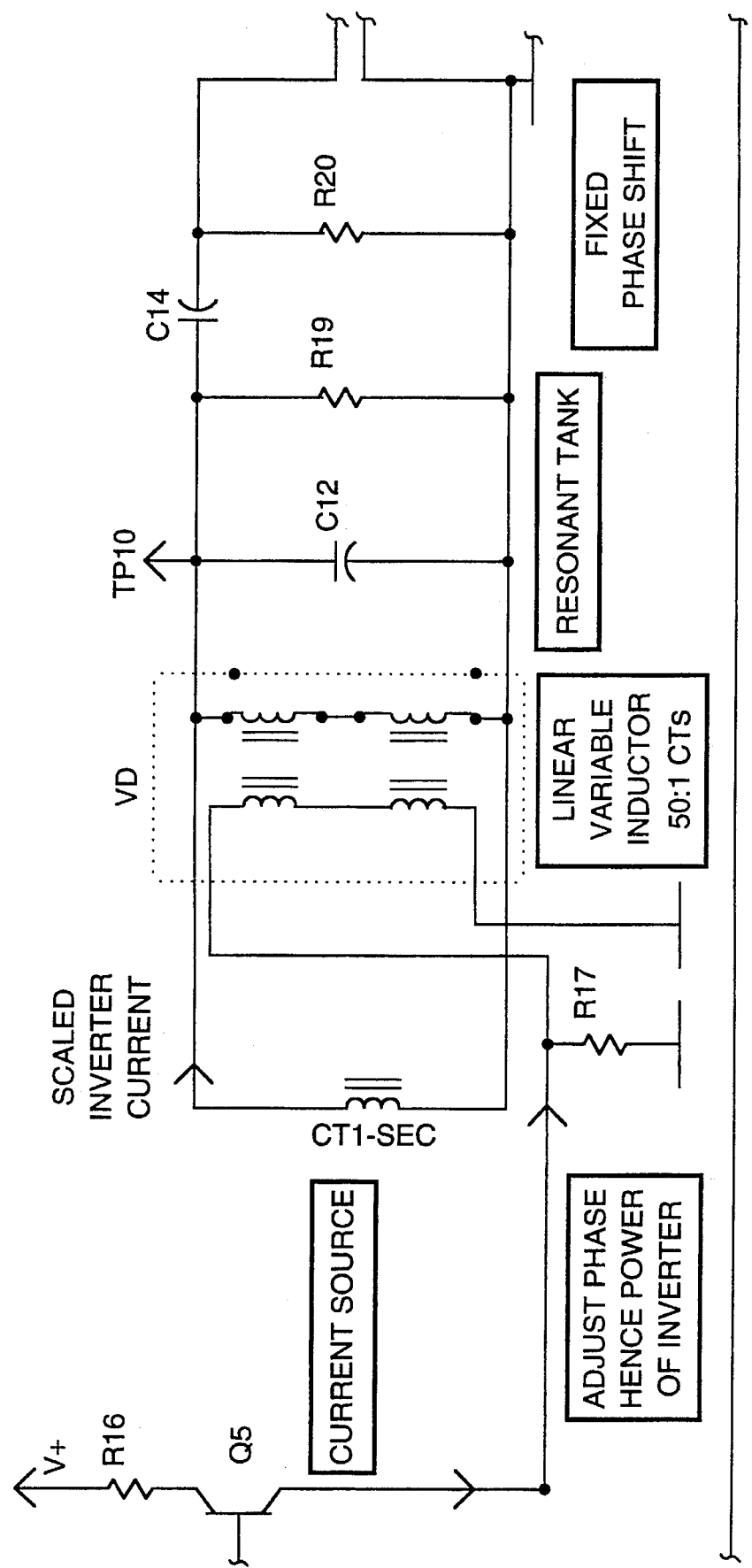

To control the phase angle, a novel technique is employed utilizing a variable impedance shown within the dotted lines in FIG. 2E as a variable inductor comprising two small current transformers having a primary to secondary ratio of 50 to 1, usually referred to in the art as a linear variable inductor. The linear variable inductor is combined with a parallel capacitance C12 and resistance R19 in a parallel tank circuit. Current transformer CT1 couples the resonant current to flow through the parallel tank. The complex impedance of the tank circuit, combined with the current flowing through it, forms a voltage across it that has a phase difference relative to the current. By controlling the DC current in the linear variable inductor, which is controlled by the current source transistor Q5 responsive to the output of the input current error op-amp amplifier U2, the complex impedance and hence the phase angle of the voltage across the tank circuit may be varied. A simple comparator U3 in FIG. 2F watches the zero crossings of the voltage generated in the tank circuit in response to the resonant current to produce the gate drive timing waveforms, which are then amplified to become the actual gate drive which runs the FET gates through a pulse transformer. The comparator U3 output waveform is used to produce the gate drive waveform.

Figure 2F:
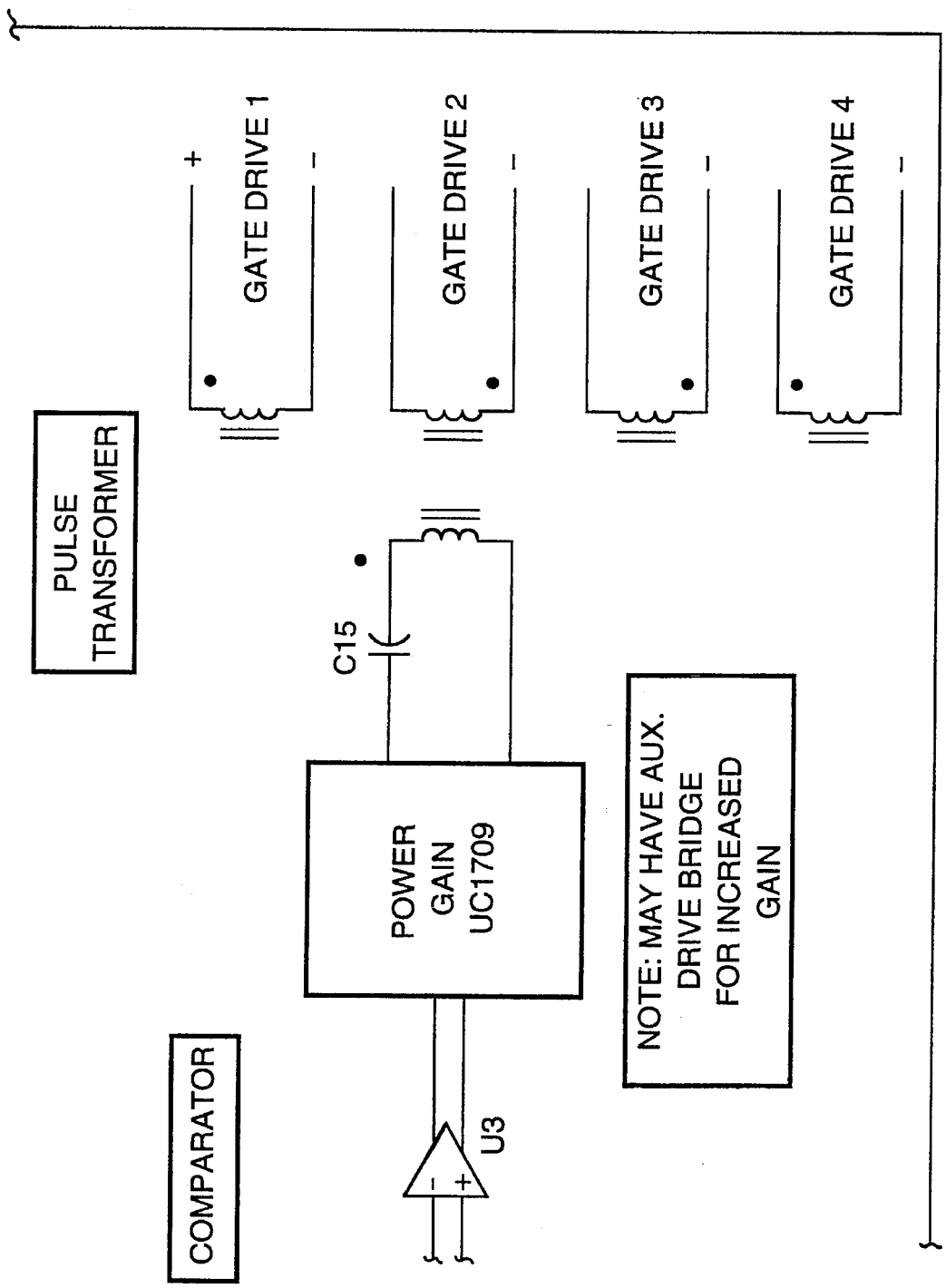

The gate drive shown in FIG. 2F is a very simple one. Other gate drive schemes that turn the FETs off quicker may be used in certain applications if desired as will be apparent to those skilled in the art. There are currently many standard circuits available to control FET drive turn-off which would be suitable.

A parallel resonant tank has a possible impedance swing of 180 degrees from +90 degrees to −90 degrees. However, as the complex impedance angle is a "tangent" term, the extremes of +90, and −90 degrees are never reached. Effectively, the control range, from experience, is approximately 135°. To control the output power, however, only a 90° swing is required. Care must be taken that the inverter never runs at a frequency below the resonant frequency of the LCC circuit.

Figure 3A:
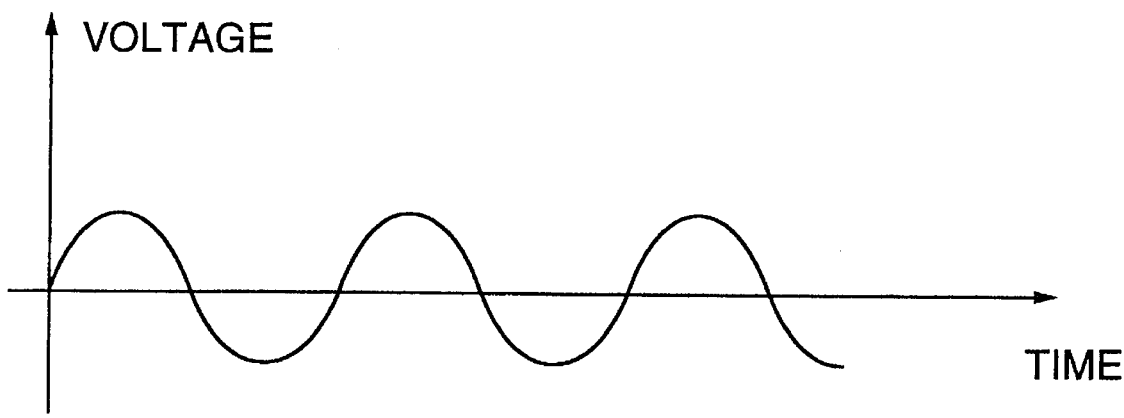
FIG. 3A is a diagram of the sinusoidal hydro voltage waveform.

The operation of the UPF converter illustrated in FIGS. 2A to 2F will now be described in further detail. The converter is powered from the utility which connects to the UPF circuits at the AC input AC1. Connection of the utility here applies voltage at a nominal frequency of 60 Hz. FIG. 3A illustrates this voltage waveform. The AC input voltage is measured by the primary side of transformer T2 (T2-prim). The secondary of transformer T2 (T2-sec) creates a voltage that "looks" identical to the AC input voltage, but it is now smaller in magnitude, and no longer directly connected to the utility. This voltage is used to measure the AC input voltage waveform so that the control circuits have a model of the AC input voltage waveform to follow. This voltage is exactly representative of the AC input voltage and can be found at TP1 in FIG. 2.

Figure 3B:
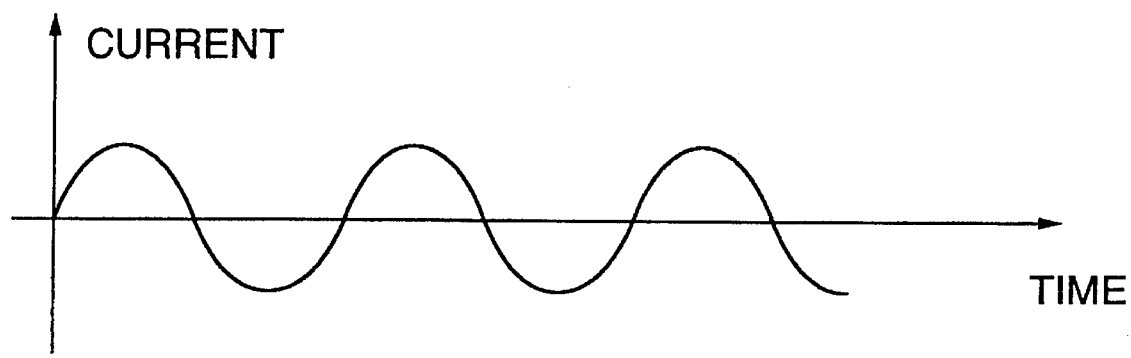
FIG. 3B is a diagram of the current for unity power factor.
Figure 3C:
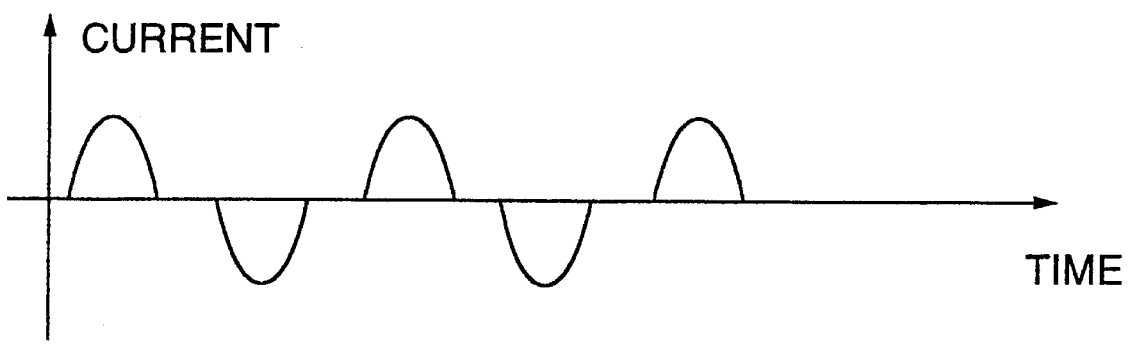
FIG. 3C is a diagram of the typical current of a low power factor converter which is full of harmonics.

The AC input flows through the primary of current transformer CT2 (CT2-prim). The AC input current flows through this current transformer primary, and an exact representation of this current flows in the secondary of the current transformer CT2 (CT2-sec). If the load is pure resistance, i.e. unitary power factor, the waveform would be as shown in FIG. 3B. This secondary current, which is exactly representative of the AC input current, flows into the resistor R10 in FIG. 2D, creating a voltage across resistor R10 which is exactly representative of the AC input current that is flowing. This voltage can be found at TP2 of FIG. 2D.

At this point we have small signal representations of the AC input voltage and current that the UPF regulator is drawing from the utility.

Figure 4A:
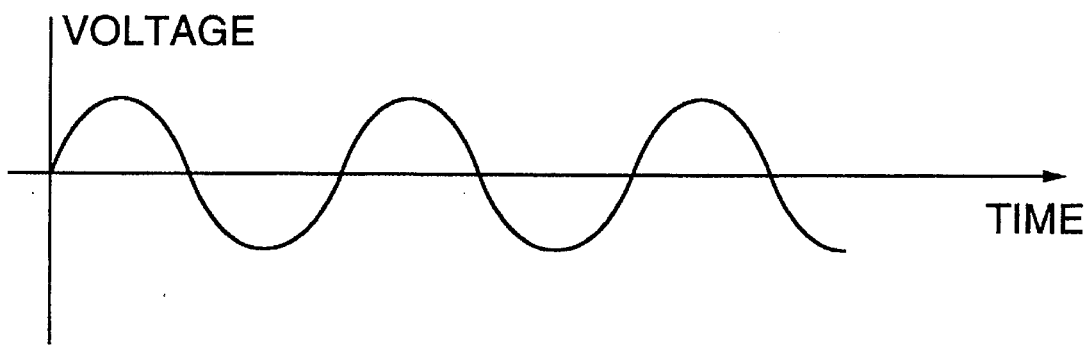
FIG. 4A is a diagram of the hydro voltage.
Figure 4B:
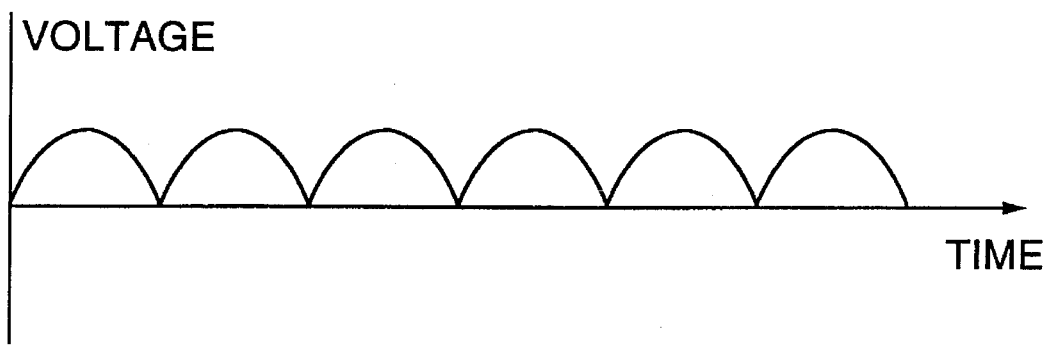
FIG. 4B is a diagram of the voltage after the diode bridge of FIG. 2A when the capacitance across the bridge is small.
Figure 4C:
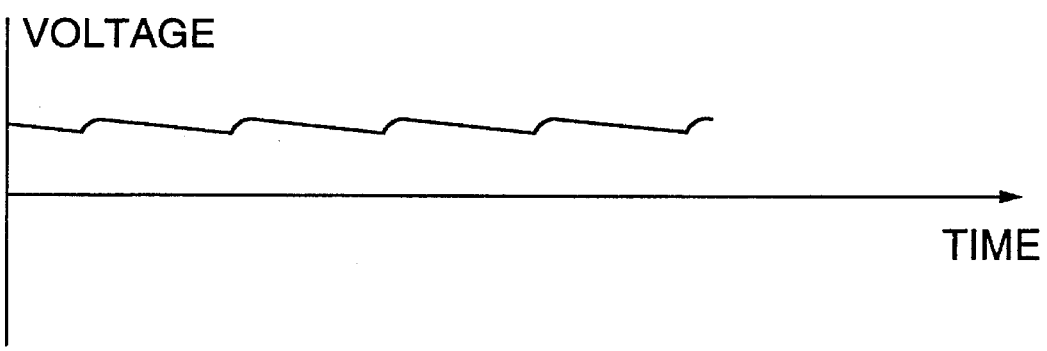
FIG. 4C is a diagram illustrating what the voltage after the diode bridge of FIG. 2A would be if the capacitance across the bridge was large.

The AC input voltage flows through a "Full Bridge" of diodes D1 in FIG. 2A. This full bridge of diodes D1 makes the voltage on the other side of the full bridge always positive, thus the AC voltage supplied by Hydro has been turned into a DC voltage. FIG. 4A illustrates the voltage waveform, called a "DC buss" after the full bridge of diodes. The capacitors connected across the DC buss are very small, hence they have no or little effect on the voltage waveform, and the voltage waveform is indeed as illustrated in FIG. 4B.

This DC buss voltage waveform from the output of the diode bridge has a full bridge arrangement of FETs Q1, Q2, Q3 and Q4 connected across it. The FETs are turned on diagonally, first the upper left Q1 and the lower right Q4 FETs are turned on, then these are turned off and the lower left Q2 and upper right Q3 FETs are turned on. This diagonal on and off action of the FETs applies the DC buss voltage to the resonant circuit L1, C6, C7, and CT1-prim first one way, then the other way, effectively placing a square wave alternating (see FIG. 5A) voltage of first DC buss, then -DC buss driving the resonant circuit. This alternating voltage action can be applied at any frequency. Applying a square wave voltage onto the resonant circuit makes current flow in the resonant circuit FIG. 5B. The specific shape of the resonant current is a function of the frequency at which the square wave is applied, the values of the resonant components and the loading or Q on the resonant circuit.

It is the variation of the frequency of the square wave DC buss voltage that is used to control the power. As the frequency is increased, the power drawn from the DC buss is reduced. In the illustrated circuit of an actual example, a frequency variation of approximately 125 kHz to approximately 175 kHz results in a power range of full power to no power.

At this point we have a square wave +/−DC buss voltage applied to the resonant circuit at a frequency which we determine. As the frequency is varied, the power drawn by the full bridge is varied, thus the power drawn from Hydro is varied.

The excitation of the full bridge of the FETs will make a sinusoidal current flow in the resonant circuit. This current flows in the series branch L1 and C6, then in the parallel branches C7 and the primary of T1 FIG. 2C. The current then returns through the primary of the current transformer CT1-prim.

During the positive half cycle of the sinusoidal resonant current, the current in C7 will cause the voltage on C7 to rise. This voltage on C7 is reflected by the transformer T1 to the secondary diodes D6 in FIG. 2C which are blocking the output voltage. At some time, the voltage on C7, hence the secondary voltage, will rise to a point where the diodes D6 becomes forward biased, and start conducting. At this point, the primary resonant current will flow through the transformer T1, through the output diodes D6 conducting and into the output capacitor C8 in FIG. 2C. This current flow at the output voltage is the output power.

The output capacitor C8 is so large it can absorb and give out the resonant and load current during the switching cycle, without any substantial change in voltage on it. Thus this forms the DC output voltage of the converter. The user places a load on this capacitor, current flows, and this current at this voltage forms the output power. The function of the control circuits are to act to control the power flow such that the output power into the large output capacitor equals the load power taken away from the output capacitor.

Figure 6:
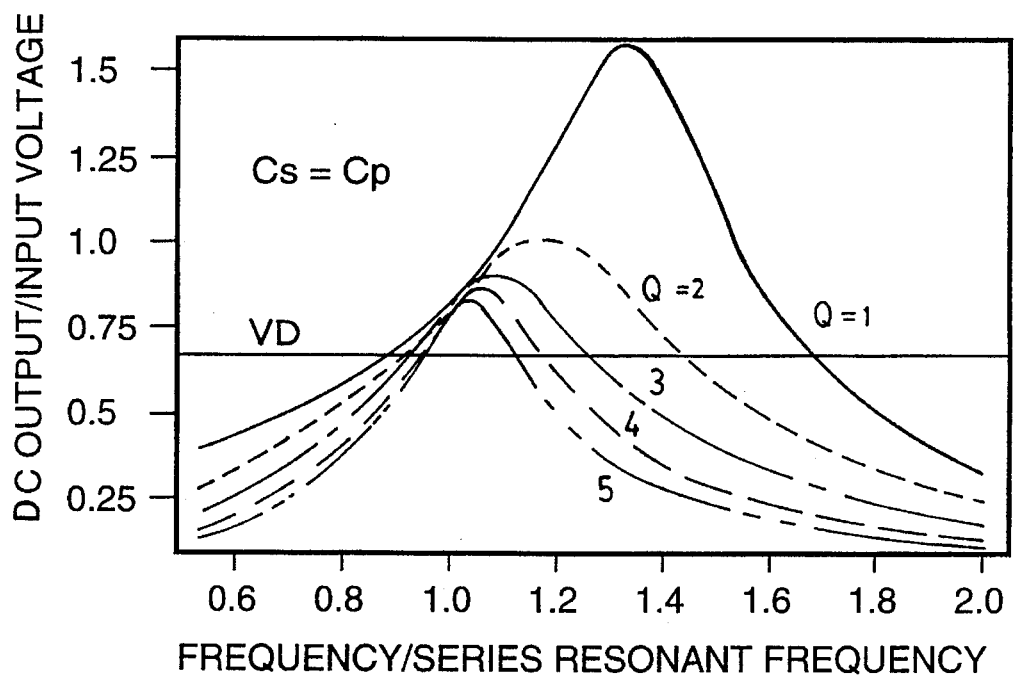
FIG. 6 is a diagram illustrating the gain of the series/parallel converter as a function of frequency and output loading (Q) with the horizontal line marking the controlled output voltage desired.

FIG. 6 illustrates the magnitude of the output voltage as the frequency and load resistance is changed. The horizontal scale shows the change as frequency is increased and the vertical scale shows the output voltage. The various Q's listed show the effect of changing the load resistance on the converter. As the load resistance is decreased, Q increases. A single horizontal line, VD in FIG. 6 represents a desired output voltage of operation. Clearly, as the load parameters (Q) change, the frequency must change in order for the same output voltage VD to occur, i.e., the same output voltage must intersect the different Q lines only at different frequencies.

For the purposes of this circuit, only operation above resonance is considered. This is the area of the falling magnitude of the output voltage as frequency is increased, essentially to the right hand side of the figure.

Figure 5A:
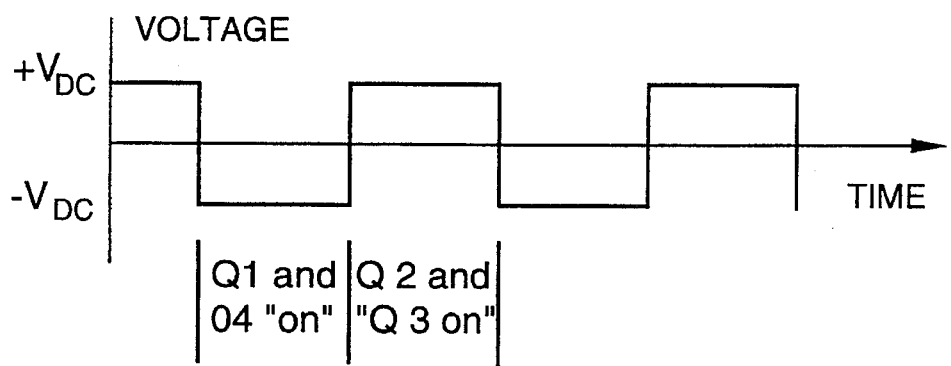
FIG. 5A is a diagram of the voltage waveforms from the full FET bridge of FIG. 2B.
Figure 5B:
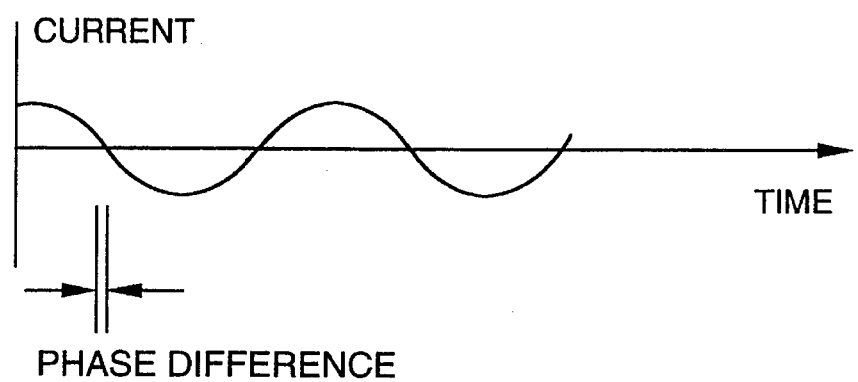
FIG. 5B is a diagram of the resonant current flowing from the FET bridge into the resonant circuit of FIG. 2B through L1 and CT1-prim.

FIGS. 5A and 5B illustrate what the voltage and current waveforms actually look like. The voltage waveform leads the current waveform thus indicating that that the circuit is operating above resonance. If the voltage lags the current, the circuit would be operating on the wrong side of the resonance and tremendous stress on the switching devices (and probable destruction) would occur. One feature of the control strategy implemented is it prevents this from occurring.

Figure 7A:
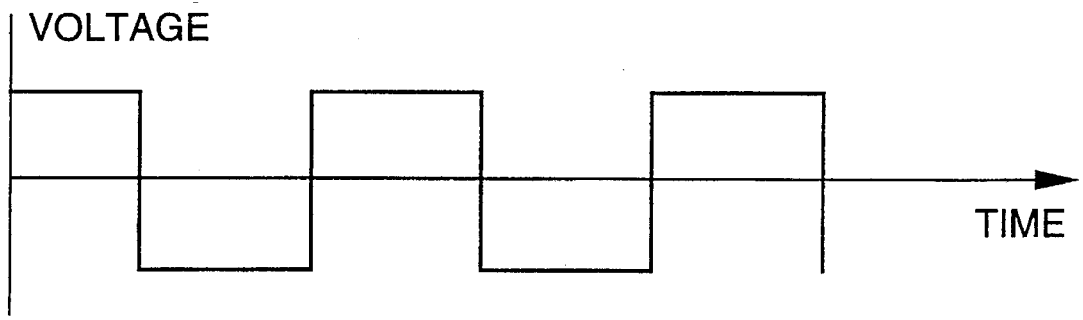
FIGS. 7A and 7B are diagrams of the inverter FET and resonant circuit voltage and current waveforms respectively at light load.
Figure 7B:
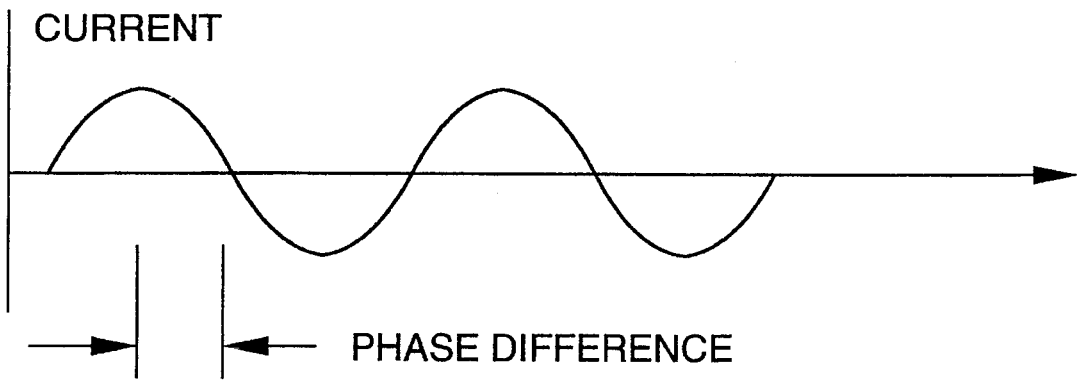

FIGS. 7A and 7B also illustrate respectively the voltage and current at light load. Here, the voltage leads the current by a substantial amount. This is at a somewhat higher frequency of operation, or to the far right of FIG. 6. If we compare this to the high power condition (FIGS. 5A and 5B), it can be seen that at low power, the current lags the voltage by a phase angle of almost 90° while at high power, the phase angle is substantially less, about 18°.

Thus, at high power, which is a lower frequency, there is an 18° phase difference between the voltage and current. At low power, the frequency is higher and there is a substantial phase difference of 90°. This relates quite well with the basic power formulae:

$$P = V*I \cos(\theta)$$

where

P=power
V=voltage
I=current
θ=phase angle between V and I

At low power, the frequency is high, the angle (θ) is 90°, cos (θ)=0, V I cos (θ) is 0, and thus the power is 0. Zero power drawn by the FET bridge will draw zero current from Hydro.

At high power, the frequency is lower, the angle between the voltage and the current (θ) is small, cos (θ) is approximately 1, and power (V I cos (θ)) is V I, essentially the actual power required from Hydro to handle the load supplied to the DC output circuit and hence the DC load. This power must be current drawn from Hydro.

Thus by controlling the frequency of the inverter circuit, the phase angle θ can be controlled, hence the output power of the inverter and the current drawn from Hydro can be controlled.

However, FIG. 6 shows also that as the load on the converter or Q is changed, the resonant frequency is changing. Thus, using only control of frequency to control the system may have a substantial chance of being on the wrong side of resonance as the load resistance hence Q is changed since the resonant frequency has changed. Operation on the wrong side of resonance, i.e. below resonance, is disastrous to the power circuits.

An increase in frequency results in less power and an increase in the angle (θ) between the voltage and the current. Thus, if the angle (θ) is controlled, the proper frequency would result and the power would be controlled as a result of the cos (θ) term of the basic power formulae. Control of the angle (θ) controls the frequency and the converter power directly without having to wait for the inertia of the resonant circuit to change its current in response to a change in frequency. This leads to improved controllability of the converter. As well, since the angle is controlled irrespective of the frequency of operation changes in resonant frequency as the load resistance, hence Q, is changed, the system will always remain on the right side of resonance, i.e. above resonance, essentially automatically tracking the change in resonant frequency.

Figure 8:
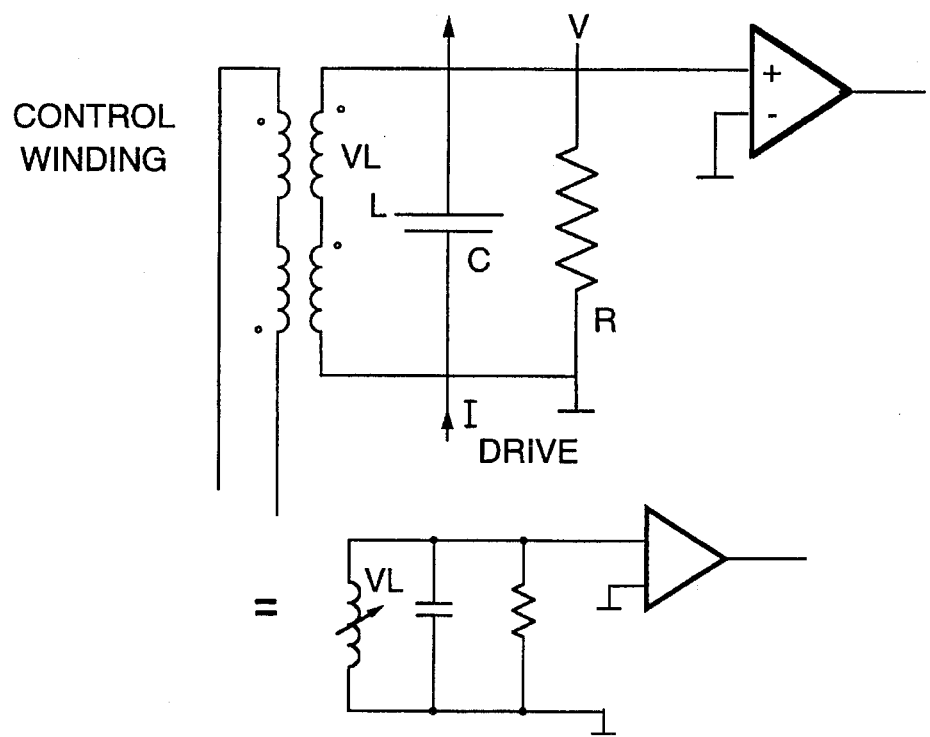
FIG. 8 is a diagram depicting the basic phase control circuit.

FIG. 8 illustrates a simple schematic of this phase control circuit which is in essence a parallel tank circuit made up of a linear variable inductor VL, the parallel capacitor and the resistor.

The linear variable inductor VL consists of two current transformers connected back to back. The actual inductance is the inductance of the current transformer. By controlling the DC current in the control winding the inductance can be varied and controlled and in turn its resonant frequency, and its complex impedance, complete with magnitude and phase angle can be controlled. Thus, by controlling the inductance of the linear variable inductor, the phase angle across the parallel resonant circuit is being controlled. A novel characteristic of this circuit is that from the control winding point of view, the voltages reflected to the control winding cancel each other out. This means any noise or strange signal that may be present on the inductor on one side, will cancel out on the control side, leaving the control side free of this signal.

The resonant circuit of the inverter or power circuit L1, C6, C7 of FIG. 2B contains a current transformer CT1-prim. This current transformer CT1-prim measures the current in the power circuit and a scaled version of the resonant current that flows in the power resonant circuit flows in the secondary of the current transformer CT1-sec in FIG. 2E. This current from the current transformer CT1 now flows through the phase control circuit. This current illustrated in FIG. 9A that is flowing in the parallel tank circuit will create a voltage, illustrated in FIG. 9B that is directly related to the impedance, and is a function of both in magnitude and phase. Hence, a voltage is created across the control circuit that is directly related to the main power resonant current and whose phase is controllable.

Figure 9A:
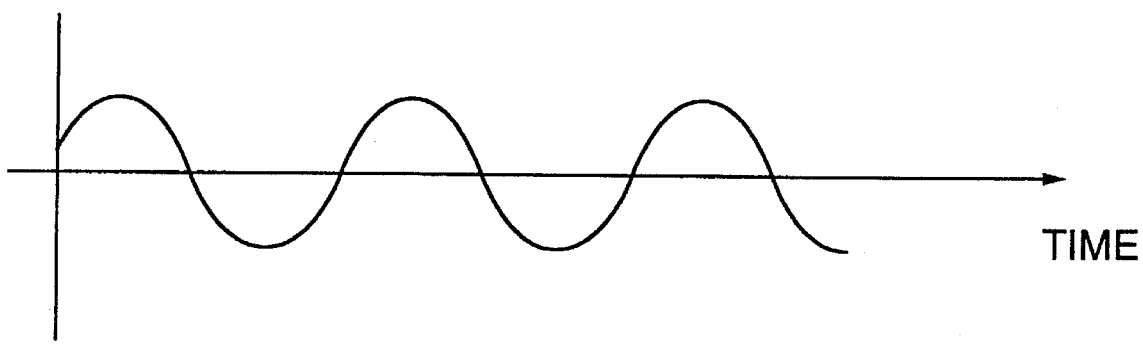
Figure 9B:
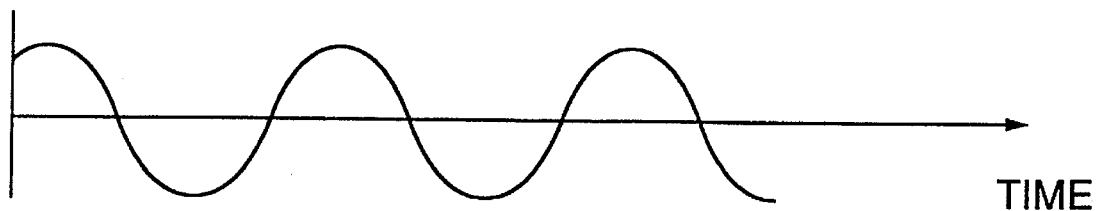
Figure 9C:
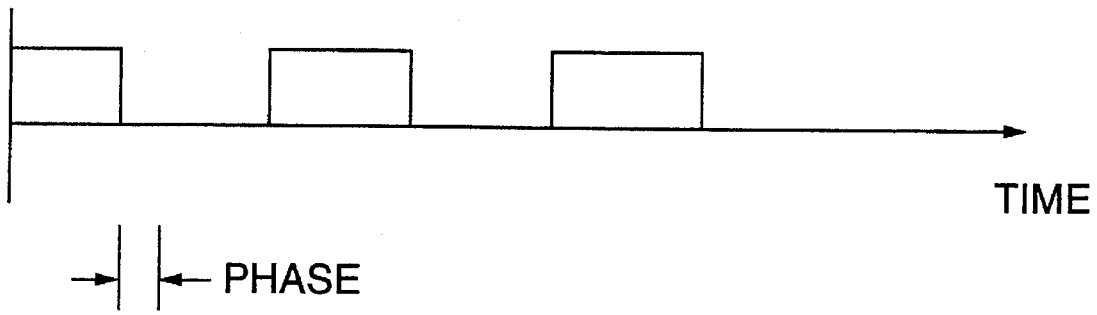

Referring to FIGS. 9A, 9B and 9C, this phase difference can be determined by looking at where the respective waveforms cross zero, as this is how the phase difference is defined. A simple comparator U3 in FIG. 2F can be used to measure where the zero crosses of the voltage waveform occur. The output of the comparator is at one state, or high, when the voltage is positive and at another state, low, when the voltage is negative as shown in FIG. 9C.

Figure 10A:
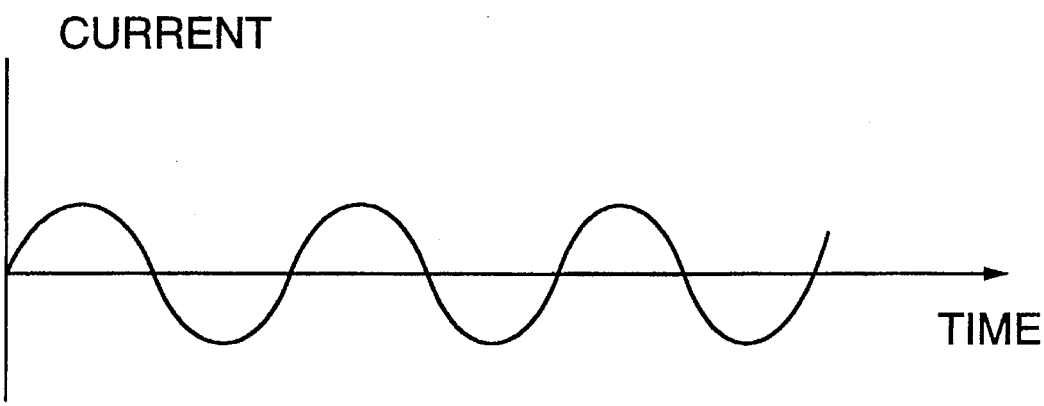
FIG. 10A is a diagram of the FET drive current waveforms.
Figure 10B:
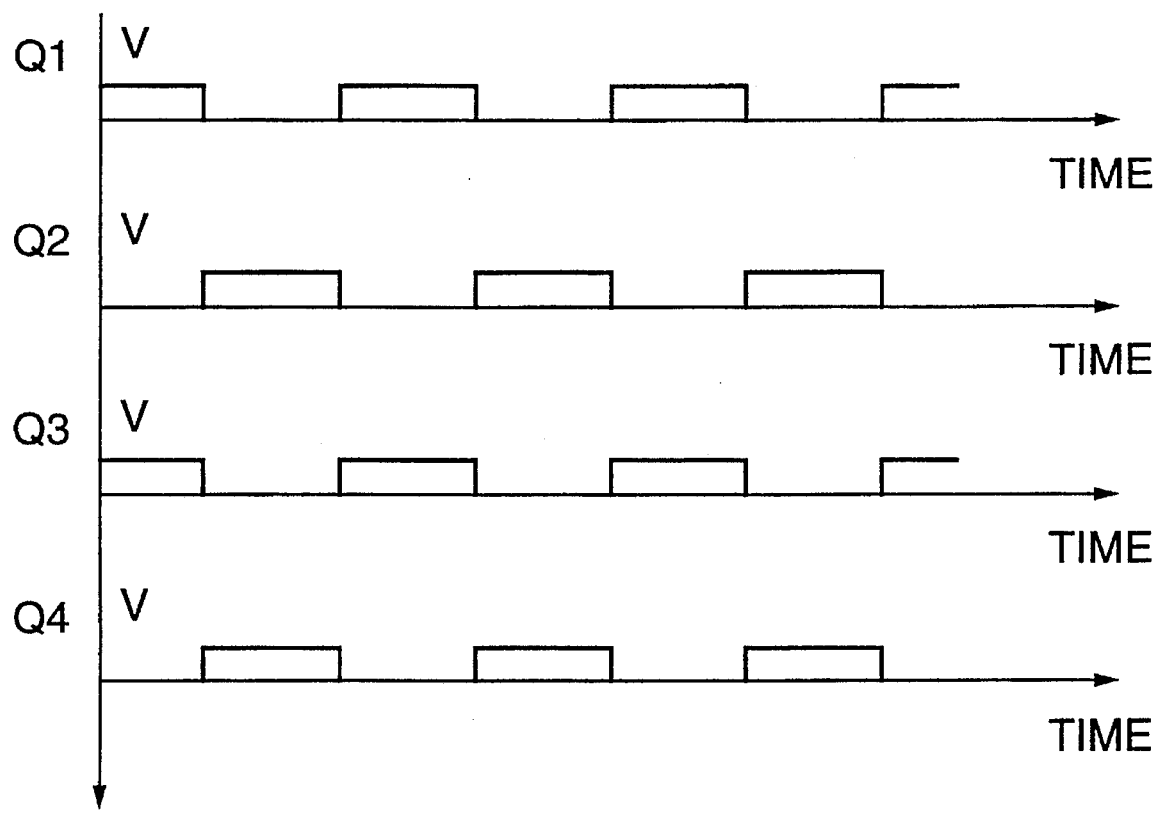
Figure 11:
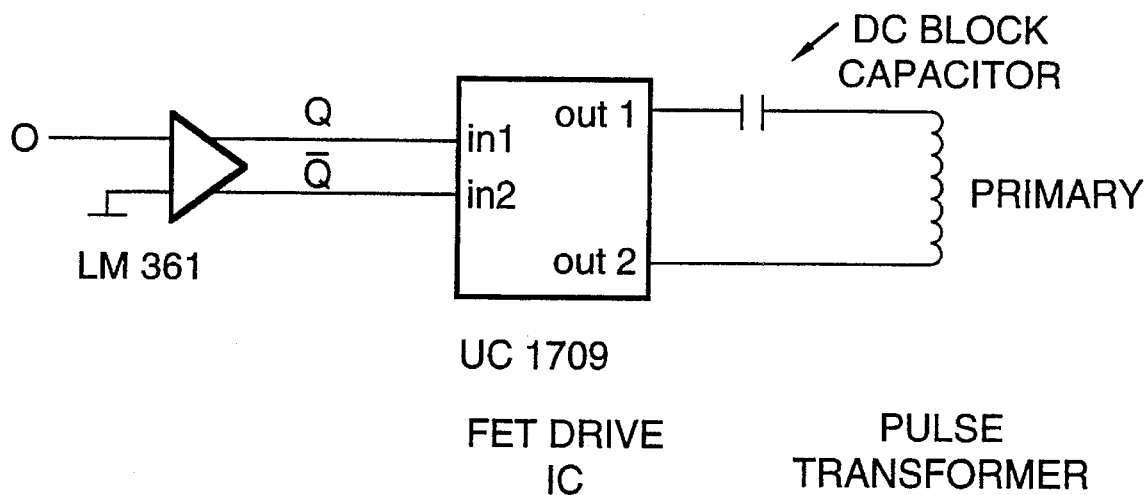
FIG. 11 is a simple schematic diagram of the FET drive amplifier.

For the FET gates, FIG. 11 is a diagram of the gate drive amplifier UC1709. The output of the comparator is, in essence, the required FET gate drive signal. The comparator chosen, an LM361, has two outputs, one output the inverse of the other, thus the timing for the gate drive for all corners of the full bridge of FETs is available as illustrated in FIG. 10B.

Figure 12A:
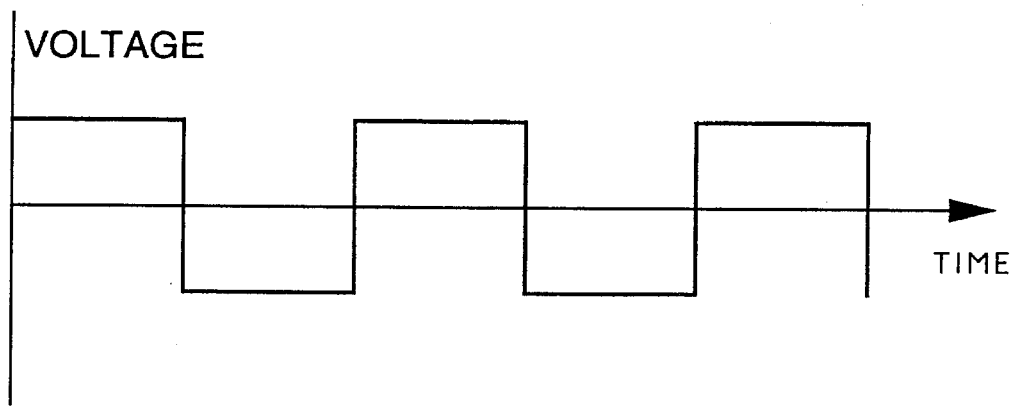
FIG. 12A is a diagram of the FET drive waveform without shaping.
Figure 12B:
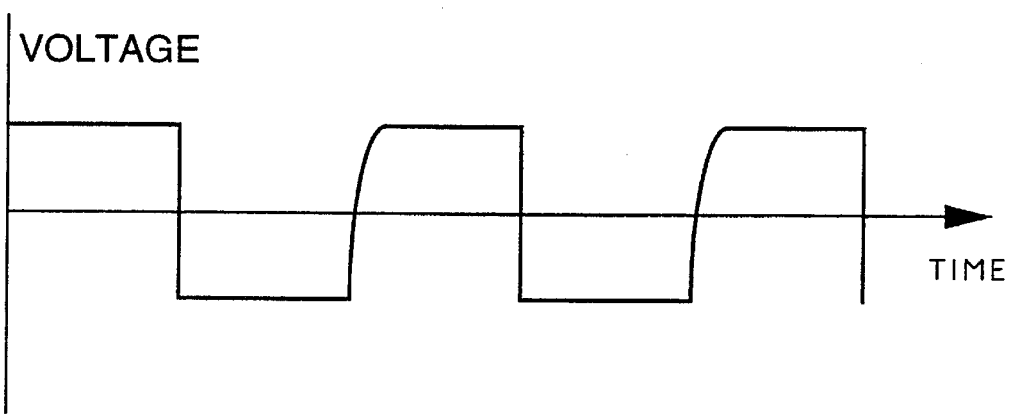
FIG. 12B is a diagram similar to FIG. 12A but showing the effect of a resistor diode shaping network.

This signal, applied to a pulse transformer shown in FIG. 2F that is connected to the gates, results in the gate waveforms shown in FIG. 12A. The FET gate is positive when the FET is on, and negative when the FET is off. This negative gate voltage is beneficial to the FET as it increases the error margin of the FET so that the FET is guaranteed to be off. As well, with both the upper and lower FETs in the bridge connected to the same transformer, if the voltage on one FET gate is positive, the other one is guaranteed to be negative by the pulse transformer action and phasing. Thus it is impossible to have both FETs in one of the full bridge legs simultaneously on.

This avoids any problems with what is called "shoot through", where, in some gate drives, it is possible to have the two FETs in a leg of the full bridge on together briefly, forming a temporary short circuit across the DC buss, usually resulting in the destruction of the FETs.

On the actual gate drive of the FETs, a small resistor and diode R1, D2, etc., perform some simple signal conditioning. With this arrangement, the FET will turn off quickly and turn on slowly. When the transition occurs in the FET gate drive, the FET that was on turns off very quickly, but the FET that will turn on next is slightly delayed. This means there is a finite time when neither FET is on. This helps guarantee that the two FETs are never on together.

When the system is in control, the voltage on the two input pins of an op-amp will always be identical. The op-amp will always move its output voltage in an attempt to keep the voltage on its input pins identical. The voltage on the input pins will only be different if the op-amp or the system is out of control. For the purposes of this following description, the op-amps are always in control.

Referring to FIG. 2D, the voltage error op-amp U1 compares the output voltage of the system (TP4) against the reference voltage of the system (TP3). The system is in control, so the voltage divider made by R7 and R18 produces zero volts (they are opposite polarity) on the input of the voltage error op-amp U1 pin 2. This equals the zero volts on the other pin of the op-amp. The op-amp is in control. The feedback elements R8 and C11 are used to stabilize the control systems.

The output of the voltage error amp (TP5) is a specific DC voltage that, when combined with the rest of the system, has it in control. The voltage TP5 is then multiplied by multiplier MC1495L by the voltage on TP1 which is a representation of the AC input voltage resulting in the same sinusoidal voltage, but a different magnitude. As the voltage on the voltage error op-amp goes up and down in magnitude, the output of the multiplier (TP6) will be the same sinusoidal voltage, but it will also go up and down in magnitude in response to the voltage error amplifier which, when it has control, keeps the output voltage and the reference voltage always identical.

The output of the multiplier (TP6) is the line current reference. This waveform is identically what it is desired that the AC input current look like. This voltage is sinusoidal, and "looks" exactly like the AC input voltage. Its magnitude, when the system is in control, is identically the AC input current required to create the input power that is then transferred to the output of the unit.

The line current error op-amp U2 compares on a continuous basis what the desired voltage of the line current is required to be (TP6), and what it actually is (TP2). When in control, the op-amp U2 will keep these voltages the same at all times. At any specific time, the voltage divider R11 and R12 creates a voltage at the input of the op-amp on pin 2 of U2 which is zero. This equals the voltage on the other pin. R13 and C12 are used to stabilize the system. When in control, the op-amp U2 will act to maintain the voltages on its inputs identical.

The output of the line current error op-amp (TP7) is connected to R14. R14, FIG. 2D, and R16, and Q5, FIG. 2E form a circuit called a current source. In its simplest form the current in the base resistor R14 is amplified by the gain of the transistor. Thus, whatever current is flowing in R14, an amplified amount of current is forced to flow in the collector of Q5. As the output of the line current error op-amp (TP7) goes lower in voltage, the voltage operating the current source R14 increases, thus the current in Q5 increases.

The current in Q5 is the control current for the linear variable inductor in the phase control circuit FIG. 2E described earlier. Resistor R17 provides a shunt path for the inductor VL to guarantee that the current in the inductor always has someplace to go. Thus, by controlling the phase of the inverter that acts in response to the line current error op-amp U2 whose function is to keep the AC input current identical to the line reference current, the AC input current is controlled.

As the voltage of the line current reference increases due to its sinusoidal shape, it will try to move the negative pin of the control op-amp U2 negative. Moving the negative op-amp pin negative, the output voltage of the op-amp U2 will move positive. As the op-amp voltage moves positive, there is less voltage across the current source R14, R16 and Q5, and the current to Q5 base reduces. A corresponding decrease in the collector current of Q5 will occur, hence the current in the linear variable inductor VL decreases.

This will increase the inductance of the linear variable inductor. As the inductance increases, the phase angle of the inverter decreases, the cos (theta) term in the power formulae increases, the inverter draws more power, hence the AC input current increases exactly to match the line current reference. As the line current reference goes over the cycle of 60 Hz, the AC input current drawn follows this reference.

As a result, the AC input line current "looks" exactly like the input line voltage. This is Unity Power Factor.

The system will now be described when the load changes for some reason: it increases. Since the power flow for the instant is fixed, as the load is increased, the voltage on the output capacitor C8, FIG. 2C, decreases, as the difference in power must come from the capacitor. As the output voltage decreases TP4, FIG. 2D, the voltage on pin 2 of the voltage error op-amp U1 decreases. As soon as the voltage decreases, the output TP5 of the op-amp U1 moves more positive to keep the voltage on its two input pins the same. This higher voltage is then fed to the multiplier MC1495L where it is multiplied by a scaled representation of the input voltage, creating a larger sinusoidal line current reference voltage TP6.

The line current error op-amp U2 sees the difference in the line current reference TP6 and the actual AC input current TP2. The line current reference is larger. The output TP7 of the line current error op-amp U2 moves more positive to compensate. This reduces the current in the current source and less current will flow in the control inductor VL of the phase control circuit in FIG. 2E. The inductance will increase the phase difference in the inverter will become less, and the power matches the increased load that was added to the system. Since the line current reference from the multiplier is an exact scaled replica of the AC input voltage, the AC input current drawn by the inverter "looks" like the input voltage, hence, the Unity Power Factor is maintained.

In reality, there are delays in the system and circuits, hence, even though the circuits act as described, the Unity Power Factor is not absolutely perfect at matching the line voltage and current at all times. However, a power factor has been measured at 0.99 in prototype development testing and the result is excellent.

The inverter control scheme is free of timing ICs and consists only of passive devices and linear devices. This is especially beneficial in a static or noisy environment.

A major advantage of the present invention is High Power Capability, the Unity Power Factor technique is easily extended to very high power—low cost 20 Kw modules are not unreasonable. There is no reasonable mains voltage limitation as components are currently available to operate the technique at high power on AC inputs as high as 480 Vac. The present invention results in high power density for a small size, the high frequency operation of 125 to 150 Khz makes for small, light weight reactive and power handling devices. The present invention achieves low cost as the cost of the power components are reasonably low; the implementation is quite cost effective on a per watt basis at higher power levels. Indeed, the high power factor as seen from the switching devices maximizes the cost effectiveness of the approach. The technique, being resonantly based, exhibits minimal EMI/RFI compared to its PWM counterparts. The present invention provides High Power Factor over the full range of operation. Excellent power factor with extremely low harmonic content is maintained over all line and load conditions. The present invention provides efficiency up to 90% and greater. Excellent efficiency over all conditions is maintained. The present invention also provides inherent current limiting on overload. Under overload conditions, current limiting is inherent and shows up first as an increase in the harmonic content of the input current, then as loss of regulation of the output.

A 51 volt Unity Power Factor Converter was constructed by breadboard using the following values for the components:

| R1 | 68Ω | R2 | 68Ω | R3 | 68Ω |
| R4 | 68Ω | R20 | 200Ω | D1 | MB2510 |
| R5 | — | C1 | 4.7 μf | D2 | MUR110 |
| R6 | 1kΩ | C2 | 2200 pf | D3 | MUR110 |
| R7 | 10kΩ | C3 | 220 pf | D4 | MUR110 |
| R8 | 10kΩ | C4 | 200 pf | D5 | MUR110 |

-continued

| R9 | 47Ω | C5 | 2200 pf | D6 | 4 × MUR1620CT |
| --- | --- | --- | --- | --- | --- |
| R10 | 5Ω | C6 | .066 µf | D7 | 1N4733 |
| R11 | 27kΩ | C7 | .12 µf | Q1 | 3 × IRFP450 |
| R12 | 6kΩ | C8 | 470,000 µf | Q2 | 3 × IRFP450 |
| R13 | 47kΩ | C9 | 4.7 µf | Q3 | 3 × IRFP450 |
| R14 | 1kΩ | C10 | 10 µf | Q4 | 3 × IRFP450 |
| R15 | — | C11 | 10 µf | Q5 | MJE120 |
| R16 | 100Ω | C12 | 2200 µf | U1 | MC34001 |
| R17 | 47Ω | C13 | .22 µf | U2 | MC34001 |
| R18 | 100k | C14 | 1000 pf | U3 | LM361 |
| R19 | 200Ω | C15 | 10 µf | | |

Power gain UC1709 enhanced by full bridge of IRFZ34 and IRF9Z30
Pulse Transformer custom made with 10×F41306 Ferrite toroids

| T1 | 18T primary, 4T secondary |
| --- | --- |
| T2 | 208/5 V Transformer |
| CT1 | Pulse PE51686 50:1 |
| CT2 | 200:1 on steel core |

The above description and attached drawings are simplified and do not show standard features of converters such as soft start, feedback loop rolloff, etc. as they are not necessary for a full understanding of the invention. Persons of ordinary skill in the art will easily understand the standard features not specifically illustrated and will be able to add them to the converter described. In addition, it will be undertood by persons skilled in the art that the values of the components are not essential limitations but alternative equivalent components may be substituted therefor.

Although various preferred embodiments of the present invention have been described herein in detail, it will be appreciated by those skilled in the art, that variations may be made thereto without departing from the spirit of the invention or the scope of the appended claims.

The embodiments of the invention in which an exclusive property or privilege is claimed are defined as follows:

1. A converter for interposition between an AC power source and a DC load to maintain a substantially Unity Power Factor independent of the impedance of the load, said converter having rectifying circuit means to provide DC power to a DC power output circuit from an AC source, impedance varying means for varying the impedance seen by the AC source in the DC output circuit, and means responsive to a shift in AC input current away from an in-phase relation with the voltage of the AC source under loading of the DC power output circuit for controlling said impedance varying means in a direction to return the AC current towards in-phase relation with the AC voltage or to alter the magnitude of the AC current to counteract any variation of DC output voltage under loading, said means for varying the impedance seen by the AC source comprises an inverter having a power resonant circuit interposed between said rectifying means and said DC power output circuit and a phase shift control means controlling the phase between the voltage and current in said power resonant circuit while always maintaining the voltage leading the current, and said means responsive to a shift in AC input current from an in-phase relation with the voltage of the AC source and to DC output voltage variations is connected to control said phase shift control means.

2. A converter as claimed in claim 1 in which said phase shift control means comprises a parallel tank circuit including a variable impedance, said parallel tank circuit being linked to said power resonant circuit to provide in said parallel tank circuit a current representative of the power resonant current, and said means for controlling said phase shift means is connected to control said variable impedance.

3. A converter as claimed in claim 2 in which said variable impedance is a linear variable inductor.

4. A converter as claimed in claim 3 in which said power resonant circuit comprises a FET drive driving a series parallel resonant circuit feeding an output power storage devices through an isolating transformer, and said phase shift control means is connected to control the gating of said FET drive.

5. A converter for interpositioning between an AC power source and a DC load to maintain a substantially unity power factor independent of the impedance of the load, said converter having rectifying circuit means for rectifying AC input to produce a DC voltage on a DC buss, an inverter having a power resonant circuit connected to be driven from said DC buss and connected to deliver output power through a rectifying circuit to a DC power storage device for delivering power to a DC load, means for controlling the phase angle between the voltage and current in said power resonant circuit while always maintaining the resonant voltage leading the resonant current, and a control circuit for controlling said means for controlling said phase angle responsive to the output voltage of said DC power storage means, a measured amount of AC line voltage and a measured amount of AC line current to adjust said phase angle in a manner whereby said resonant power circuit draws power from said DC buss to match power delivered to a DC load and said DC buss draws matching power from the AC source with the AC voltage and AC current essentially in phase for unity power factor said means for controlling the phase angle between the voltage and current in said power resonant circuit comprises a variable impedance connected in a resonant tank circuit incorporating a measured amount of resonant current flowing in said power resonant circuit, said control circuit being connected to control said variable impedance to effect the desired phase angle control.

6. A converter as claimed in claim 5 in which said DC buss has minimal energy storage and said resonant circuit is selected from a parallel resonant circuit and a series parallel resonant circuit.

7. A converter as claimed in claim 5 in which said DC buss has minimal energy storage and said resonant circuit is a series parallel resonant circuit.

8. A converter as claimed in claim 7 in which said series parallel resonant circuit is driven by a full bridge of field effect transistors.

9. A converter as claimed in claim 8 in which said series parallel resonant circuit is connected to said power output rectifying circuit means through an isolation transformer.

10. A converter for interpositioning between an AC power source and a DC load to provide substantially unity power factor independent of load imposed on the DC power output, said device comprising rectifier circuit means for connection to an AC source, a power circuit means connected between said rectifier circuit means and a DC power output circuit for drawing power from an AC power source and delivering same to said DC power output circuit as a function of the phase angle between the voltage and current in said power circuit means, and circuit means responsive to a measured AC current demand and a measured actual AC current created when a DC load is placed on said DC power output circuit to control the phase angle of said power current relative to said power circuit voltage in a manner whereby the measured AC current demand and measured actual AC current are essentially identical and the instantaneous power of said power circuit means taken from said rectifier circuit means to meet the DC load demand is essentially equal to the instantaneous AC power delivered to said rectifier circuit means said power circuit means comprises an inverter in the form of a resonant power circuit selected from a parallel resonant circuit and a series parallel resonant circuit driven from said rectifier circuit means by a FET Bridge, and said circuit means for controlling the phase angle of said power circuit voltage and current comprises a resonant tank circuit for controlling the gating of said FET bridge, said resonant tank circuit being linked to resonant current flowing in said resonant power circuit and including a variable impedance for altering the phase of voltage across said tank circuit relative to said resonant power circuit current, said variable impedance being connected to respond to differences in measured line current demand and measured actual line current to control said FET bridge gating in a direction to change the phase angle between the resonant power circuit voltage and current to counteract such differences while always maintaining the resonant power circuit voltage leading the resonant power circuit current.

11. A converter as claimed in claim 10 in which said resonant power circuit is a series-parallel resonant circuit.

12. A converter as claimed in claim 11 in which said variable impedance is a linearly variable inductor.

13. A converter as claimed in claim 12 in which said rectifier circuit means is a full bridge rectifier.

14. A converter as claimed in claim 12 in which said FET bridge is a full bridge FET circuit.

15. A converter as claimed in claim 12 in which said DC output circuit comprises a large power storage device and said resonant power circuit is connected to deliver power thereto through an isolation transformer.

16. A converter as claimed in claim 12 in which said measured AC line current demand is a measure of AC line voltage and DC output voltage.

17. A converter for interpositioning between an AC power source and a DC load to maintain substantially unity power factor independent of the impedance of the load, said converter comprising a rectifier circuit having minimal power storage connected to feed a DC bus square wave gating means connected to said DC bus, a series parallel resonant power transfer circuit driven by said gating means, said resonant power circuit being connected to deliver power to a DC power storage device constituting a DC power output to which a DC load can be connected, means for varying the phase angle between the voltage across and current in said power resonant circuit to vary the power delivered to said DC storage device while always maintaining the voltage leading the current, and means for controlling said phase angle varying means to match the power taken by said resonant power transfer circuit from an AC source to the power required by a DC load said means for varying the phase angle between the power transfer resonant circuit voltage and current compares a resonant tank circuit and having sampled resonant power circuit current flowing therein, said tank circuit including a variable impedance for varying the phase between the voltage thereacross and the sampled current flowing therein said tank circuit being connected to effect drive of said square wave gating means to reproduce in said power resonant circuit the phase angle between voltage and current obtained in said resonant tank circuit, and said means for controlling said phase angle varying means are connected to control said variable impedance in said resonant tank circuit.

18. A converter as claimed in claim 17 in which said variable impedance is a variable inductor whose inductance is dependent on current flow thereto, and said means for controlling said phase angle varying comprises means for controlling current flow to said inductor.

19. A converter as claimed in claim 18 in which said means for controlling said phase angle varying means comprises means for comparing AC line current demand and actual AC line current demand and connected to provide current flow to said variable inductor to control the phase angle between the power resonant circuit voltage and current in a direction to render AC actual current substantially identical to AC line current demand.

20. A converter as claimed in claims 17, 18 or 19 in which said gating means comprises a FET bridge.

21. A converter as claimed in claims 17, 18 or 19 in which said resonant power transfer circuit delivers power to said DC power storage device through an isolation transformer.

22. A converter as claimed in claim 18 in which said means for controlling current flow to said inductor comprises a control circuit having means to compare the output DC voltage with a predetermined reference voltage and to then combine the result with a sample of AC line voltage to produce a line current demand voltage, means to sample actual line current to provide a line current voltage, means to compare said line current demand voltage with said actual line current voltage, and a current source connected to said variable inductor to control the impedance thereof, said current source responding to differences in said line current demand voltage and said actual line current voltage to produce a current to said variable inductor to alter the impedance thereof in a direction to effect equalization of said current demand and actual line current voltages.

\* \* \* \* \*